June 19, 1945.   F. R. HARRIS   2,378,550
CONNECTOR RING GROOVE CENTERING DEVICE
Filed April 2, 1943

INVENTOR
FREDERIC R. HARRIS
BY William F. Nickel
ATTORNEY

Patented June 19, 1945

2,378,550

UNITED STATES PATENT OFFICE 2,378,550

CONNECTOR RING GROOVE CENTERING DEVICE

Frederic R. Harris, New York, N. Y.

Application April 2, 1943, Serial No. 481,655

5 Claims. (Cl. 144—219)

This invention relates to timber connections and devices for making and centering grooves for receiving shear rings to prevent relative movement between two layers of timber which are in contact with each other.

In modern timber construction it is common practice to use shear rings for holding one timber surface against sliding or working upon another. Special tools are used for cutting grooves in the timbers, a split shear ring is placed in matching grooves in each, and the timbers are clamped tightly together over the shear ring by means of a stout bolt.

It is an object of this invention to provide means for enabling a shear ring groove to be cut around a bolt hole, the axis of which is not perpendicular to the timber surface in which the groove is to be cut, and impart to the groove the same depth at every point.

The invention provides a simple and economical tool-holding device or implement which permits the use of shear rings at locations where it has formerly been difficult or impractical to place such rings. This makes possible stronger timber structures and more latitude in the design of timber trusses.

Another object is to provide a timber connection with a fastening bolt and a shear ring between timbers that contact in a plane at an incline to the axis of the bolt.

Other objects, features and advantages of the invention will appear or be pointed out as the description proceeds.

In the drawing, in which like reference characters denote corresponding parts in all the views, Figure 1 is a sectional view through a timber connection with a shear ring located between two timbers that are clamped together by a bolt fastening, the axis of which extends at an angle, other than a right angle, to the plane of the timber surfaces in which the shear ring is inserted.

Figure 1:
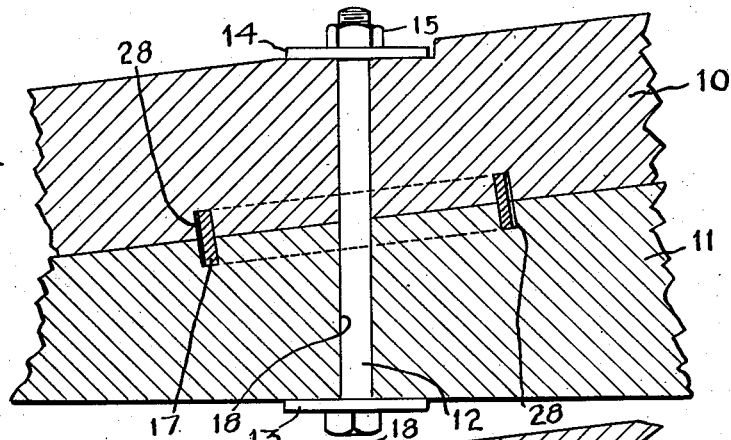

Figure 1 shows two timbers 10 and 11 clamped together by a bolt 12. This bolt has the conventional washers 13 and 14 against the two outside surfaces of the timbers. The nut 15 clamps against the washer 14, and the adjacent timber 10 is cut away to provide a face or seat for the washer normal to the axis of the bolt 12.

The timbers 10 and 11 may be portions of a truss, or some other unit which must withstand considerable stress. Resistance to sliding movement of the timber 10 on the other timber 11 can be very much increased by locating a shear ring 17 in such a position that it extends part way into each of the opposing or inner faces of the members 10 and 11. It is evident from Figure 1, however, that these faces of the timbers 10 and 11 are not normal to the bore 18 through which the clamping bolt 12 extends. Because of this fact, grooves with a uniform depth could not be cut in the timbers 10 and 11 by conventional groove cutting tools having holding devices that are centered by the bore which is provided for the fastening bolt.

This invention comprises a tool-holding or centering device 20 having a projection or stem 21 that fits into the clamping bolt bore 18. There is an abutment member, preferably a flange 22, at one end of the shank or stem 21, and this flange 22 must rest against the surface of the timber in which a groove is to be cut. The stem 21 makes the same angle with the contiguous surface of the flange or collar 22 that the axis of the bore 18 makes with the surface of the timber 10 in which the groove is to be cut.

On the other side of the flange 22 there is a projection comprising a bearing element 23 having a recess or socket 24, the axis of which is normal to the one annular surface of the flange 22 adjacent the stem and which is to engage the timber 10.

The axis of the socket 24, therefore, intersects the axis of the bore 18 at the plane of the timber surface and the socket 24 serves as a centering recess for a groove cutting tool 25. The cup-shaped tool 25 has a center stud 26 that fits into the socket 24. Cutters 27 around the periphery of the tool 25 cut a groove 28 in the timber surface as the tool is rotated.

The flange 22 is preferably circular, but not necessarily so. The same centering device can be used with bolt holes of larger diameter by merely placing tight-fitting tubular ferrules or cylindrical shims around the stem 21. It is advantageous to make the diameter of the stem 21 equal to that of the smallest bolt hole with which the device is likely to be used.

Figure 2:
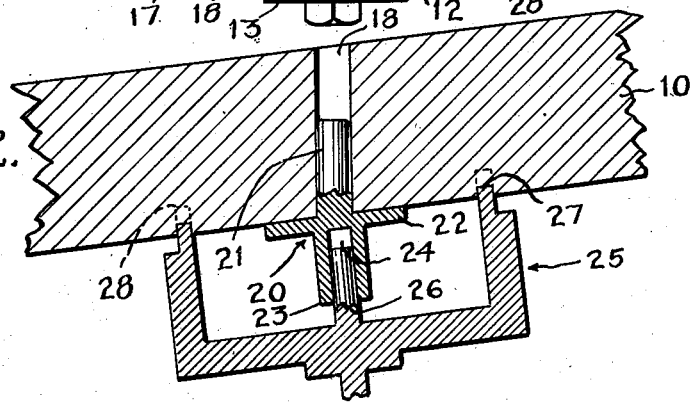
Figures 2 and 3 are sectional views illustrating a tool-holding device embodying this invention, and showing a groove cutter in position for making the shear ring grooves for the timber connection of Figure 1.
Figure 3:
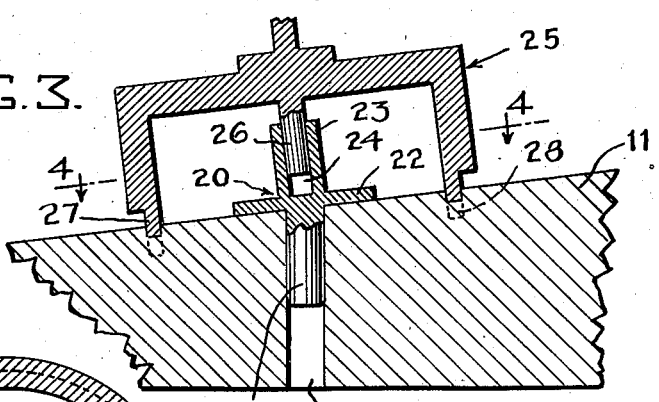
Figure 4:
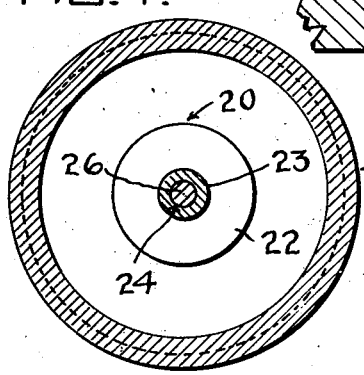
Figure 4 is a sectional view taken on the line 4—4 of Figure 3.

Figures 2 and 3 show the centering device 20 keeping the tool in mid position to cut the shear ring groove in the inner faces of timbers 10 and 11 respectively. The invention makes it possible to use conventional groove-cutting tools to cut shear ring grooves of a uniform depth around the clamping bolt holes that are not normal to the surfaces in which the grooves are to be cut. To be most effective it is important that the grooves for receiving the shear rings be of uniform depth around their entire circumference.

The timbers are first fitted together and a continuous hole is bored through the different timbers. The timbers are then separated and the grooves are cut, whereupon connectors or shear rings are inserted; the timbers then are reassembled and the bolts driven or secured home.

The preferred embodiment of the invention has been described, but changes and modifications can be made, such as adjustable angularity for the stem 21, without departing from the invention as defined in the claims. Obviously, an equivalent design would be to recess the tool stud or journal 26, and make the guide 23 solid.

I claim as my invention:

1. A holding implement for a shear ring groove cutter, including a stem to fit a bore in material into which a fastening bolt is to be inserted, a flange on the stem with a flat, lateral surface lying in a plane that is inclined to the stem and surrounding the latter, said surface being situated on the stem side of said implement and adapted to afford a steadying engagement of said implement with said material, and a bearing element for a cutter tool extending from the flange in a direction substantially normal to the plane of said surface.

2. The implement according to claim 1, in which the bearing element has a central recess in its outer end.

3. An implement to facilitate cutting annular grooves in timber and around a center that lies in a bolt hole through the timber at an acute angle to the surface that is to be cut, said implement including a flange, a stem inclined to the plane of the flange on one side thereof to fit the bolt hole, and a bearing stud on the other side of the flange and substantially normal thereto for a rotating groove cutter, said bearing having an axis that is normal to said surface when the stem is inserted in the bolt hole and the flange is in contact with said surface.

4. A groove cutter holding implement having a stem at one end, a projection at the other, the axis of the stem and the projection being out of alinement, and a collar at the junction of the stem and projection having its lateral surface on the side adjacent the stem substantially normal to the axis of said projection.

5. The implement according to claim 4 in which the projection has a bearing socket in its outer end.

FREDERIC R. HARRIS.